United States Patent [19]

Wiessner et al.

[11] Patent Number: 4,717,397
[45] Date of Patent: Jan. 5, 1988

[54] ADSORBATE RECOVERY IN PSA PROCESS

[75] Inventors: Frank Wiessner; Alfred Bolkart, both of Munich, Fed. Rep. of Germany

[73] Assignee: Linde Aktiengesellschaft, Wiesbaden, Fed. Rep. of Germany

[21] Appl. No.: 895,618

[22] Filed: Aug. 12, 1986

[30] Foreign Application Priority Data

Aug. 12, 1985 [DE] Fed. Rep. of Germany ....... 3528908

[51] Int. Cl.$^4$ .............................................. B01D 53/04
[52] U.S. Cl. .......................................... 55/26; 55/58; 55/62; 55/68; 55/75
[58] Field of Search ................... 55/25, 26, 31, 33, 35, 55/58, 62, 68, 74, 75

[56]  References Cited

U.S. PATENT DOCUMENTS

| Re. 31,014 | 8/1982 | Sircar | 55/26 |
|---|---|---|---|
| 3,086,339 | 4/1963 | Skarstrom et al. | 55/26 |
| 3,176,444 | 4/1965 | Kiyonaga | 55/58 X |
| 3,717,974 | 2/1973 | Batta | 55/58 |
| 3,797,201 | 3/1974 | Tamura | 55/62 |
| 4,070,164 | 1/1978 | Miwa et al. | 55/26 |
| 4,077,779 | 3/1978 | Sircar et al. | 55/25 |
| 4,171,207 | 10/1979 | Sircar | 55/26 |
| 4,299,596 | 11/1981 | Benkmann | 55/26 |
| 4,315,759 | 2/1982 | Benkmann | 55/25 X |
| 4,340,398 | 7/1982 | Doshi et al. | 55/25 |
| 4,371,380 | 2/1983 | Benkmann | 55/26 |
| 4,461,630 | 7/1984 | Cassidy et al. | 55/25 |
| 4,468,238 | 8/1984 | Matsui et al. | 55/62 X |
| 4,482,361 | 11/1984 | Whysall | 55/26 |
| 4,539,020 | 9/1985 | Sakuraya et al. | 55/26 |
| 4,599,094 | 7/1986 | Werner et al. | 55/26 |

FOREIGN PATENT DOCUMENTS

| 2604305 | 8/1977 | Fed. Rep. of Germany | 55/26 |
|---|---|---|---|
| 1437600 | 5/1976 | United Kingdom | 55/58 |

OTHER PUBLICATIONS

European Search Report.
Soviet Search Report.

*Primary Examiner*—Robert Spitzer
*Attorney, Agent, or Firm*—Millen & White

[57]  ABSTRACT

In a PSA process, an adsorber loaded with adsorbable components is first expanded to an intermediate pressure and then subjected to a first purging step at this intermediate pressure. Thereafter, the adsorber is subjected to additional expansion to the lowest process pressure and optionally a second purging step.

12 Claims, No Drawings

ADSORBATE RECOVERY IN PSA PROCESS

BACKGROUND OF THE INVENTION

The invention relates to the pressure swing adsorption process (PSA) for the separation of a gaseous mixture.

In general, in the PSA process, the first phase comprises selectively adsorbing components of the feed gas under pressure to obtain a gaseous stream depleted of the adsorbable components. Following the adsorption phase, the adsorber is subjected to multistage expansion to desorb the previously adsorbed components. Then the pressure is increased to the adsorption pressure and the cycle is repeated. By this operating sequence, there is obtained a residual gas consisting of desorbed components and purge gas in addition to the product gas consisting essentially of unadsorbed components.

It has also been suggested to obtain, besides the unadsorbed products, also the adsorbed components in as pure a form as possible. In this method, described in DOS No. 2,604,305, this reference being incorporated herein, an adsorber loaded with adsorbable components is first further saturated with adsorbable component in order to displace unadsorbable gas that has remained in the interstitial voids of the adsorber. Thereafter, the pressure in the adsorber is lowered, preferably to subatmospheric pressure, to obtain a stream of desorbate as the secondary product. In order to avoid contamination of this secondary product, no purge gas is employed in this process.

SUMMARY OF THE INVENTION

An object of one aspect of this invention is to provide a process of the type discussed above, resulting in not only a stream of unadsorbable components, but also a stream enriched in adsorbable components.

A subgeneric aspect of the invention is to so treat a gaseous mixture containing at least three components, so as to produce, in addition to a stream of unadsorbable components, also a stream enriched in a strongly adsorbable component.

Upon further study of the specification and appended claims, further objects and advantages of this invention will become apparent to those skilled in the art.

To attain these objects, the improvement comprises purging of an adsorber with a purge gas under an intermediate pressure ranging between the adsorption pressure and the lowest expansion pressure while simultaneously withdrawing a gas enriched in adsorbable components from the adsorber; then lowering the pressure in the adsorber to the lowest expansion pressure, and withdrawing a residual gas from the adsorber.

According to this invention, the conventional desorption of a loaded adsorber can be visualized as being separated into two partial steps wherein, in a first step, at a pressure above the lowest process pressure, a partial desorption takes place, obtaining a stream rich in desorbate. This first partial step is interrupted prior to complete desorption and then desorption is continued in the second partial step by lowering the pressure down to the lowest process pressure. In this way, it is possible to discharge a stream rich in desorbate at an intermediate pressure, and it is also possible to obtain the desired desorbate in a higher concentration than during the conventional purging under the lowest process pressure.

As a preferred feature of the invention, it is advantageous for the purging to take place countercurrently to the adsorption direction so that the desorbed gas can be withdrawn from the inlet end of the adsorber, i.e., from the end where the degree of loading is highest.

Desorption of the adsorber can be completed, after purging under intermediate pressure, solely by reducing the pressure further. However, it is also often advantageous as a further preferred feature of the invention to augment this desorption by an additional purging step at the lowest process pressure.

In PSA processes, it is also conventional to interrupt the loading of an adsorber before the adsorption front has reached the outlet end of the adsorber. This yields the advantage that the subsequent expansion of the adsorber can be conducted in part cocurrently to the adsorption direction, the adsorption front progressing further to the outlet end, but with insignificant breakthrough, if any at all, of the adsorption front. Cocurrent expansion can be conducted in one or more stages. Before substantial amounts of adsorbable components exit from the outlet end of the adsorber, the expansion is then generally switched to countercurrent flow. When applying the present invention to such a method, it is advantageous to perform the purging step of the invention under an intermediate pressure after termination of cocurrent expansion and prior to countercurrent expansion. Such an intermediate pressure is typically substantially below the adsorption pressure and more in the proximity of the lowest process pressure than of the adsorption pressure. Typical adsorption pressures range from 15 to 30 bar while the lowest process pressure is usually between a rough vacuum of, for example, 50 torr, and 2 bar, especially at a value approaching atmospheric pressure. In such processes, it is advantageous to set the intermediate pressure at about 1 to 6, more preferably about 2 to 5 bar above the lowest process pressure.

A more comprehensive embodiment of this invention is applied to a gaseous mixture containing at least three components, of which at least two are strongly adsorbable so that, after termination of an adsorption phase, at least two adsorbable components are bound to the adsorbent. The loading of the adsorber in such a case exhibits at least two different zones, namely a zone neighboring the inlet end of the adsorber wherein the most strongly adsorbable component is enriched, and an adjoining zone wherein the less adsorbable component is enriched. In such a system, a gas enriched in the most strongly adsorbable component is withdrawn during the purging step that takes place under intermediate pressure. Purging occurs countercurrently and is suitable terminated before substantial proportions of the less adsorbable components exit from the adsorber.

The further expansion to the lowest process pressure, following the purging step, can in this version also be effected countercurrently, but in some cases of application it is also advantageous to effect expansion cocurrently.

In a special embodiment of the expansion step conducted after purging, the expansion takes place cocurrently for the section of the adsorber loaded predominantly with the most strongly adsorbable component and countercurrently for the section of the adsorber loaded predominantly with a less strongly adsorbable component. This can be accomplished, for example, by providing a central tap in the adsorber arranged approximately at the level of the adsorption front from the most strongly adsorbable component after termination of an adsorption phase. It is also possible in this process version to subdivide the adsorber into two series-connected adsorbent containers of which the first is loaded after termination of an adsorption phase with essentially only the more strongly adsorbable component, and the second is loaded with essentially only the less adsorbable component. With such a subdivision of the adsorbent between two containers, it can also be advantageous to expand, following the purging step, only the second container further to the lowest process pressure while the first container remains at the intermediate pressure. This way, under certain circumstances, expanding the second container will have a positive effect on the overall efficiency of the process, for example in cases wherein the less adsorbable component is to be recovered for other purposes than merely as waste gas.

In a specific embodiment of the invention, purging can take place under intermediate pressure with a purge gas consisting essentially of the less adsorbable component.

It is self-evident that the term "component" utilize frequently hereinabove does not always mean merely one individual gaseous component, but can also involve, if applicable, groups of individual ingredients.

Other purge gases include but are not limited to a partial stream of the unadsorbable component withdrawn from the adsorber outlet end during an adsorption phase, or to any suitable foreign gas, if available, which is essentially free of adsorbable components.

The process of this invention can be utilized in a large number of separation processes. It is suitable, for example, for producing an ammonia synthesis gas from a mixture of hydrogen, nitrogen, and carbon dioxide, wherein not only a hydrogen/nitrogen mixture in a stoichiometric ratio suitable for ammonia synthesis is obtained, but also a fraction rich in carbon dioxide as well. Another application is in the fractionation of refinery gases containing essentially hydrogen, light hydrocarbons, and higher hydrocarbons, and wherein, besides obtaining a fraction rich in hydrogen it is also desirable to produce under elevated pressure a fraction of higher hydrocarbons of high heating value. Such examples are, however, non-limiting since the invention is not in any way dependent on the nature of gases being treated or the adsorbents employed so long as the principles of this invention are followed. Thus, this invention is not limited to a specific adsorption process but rather can be utilized in all conventional adsorption methods as well as those not yet discovered with any desired number of adsorbers, for example between 3 and 12 adsorbers.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight; unless otherwise indicated.

EXAMPLE 1

A gaseous mixture consisting of three components A, B and C is separated in a PSA facility so that the most strongly adsorbable component C is entirely adsorbed, and the less adsorbable component B is partially adsorbed, and a product stream containing the least adsorbable component A as well as a portion of component B is withdrawn during an adsorption phase from the outlet end of an adsorber. After termination of an adsorption phase, the zone neighboring the inlet region of an adsorber is loaded with component C, and the downstream zone is loaded at least partially with component B. Component A is also contained in the adsorber but practically only in the interstitial voids between the particles of adsorbent. The loaded adsorber is then initially expanded cocurrently from an adsorption pressure of, e.g., 25 bar, thereby withdrawing an expansion gas containing components A and B.

The cocurrent expansion gas is withdrawn during several cycle steps and depending on the pressure of the expansion, it is used at such pressures for conducting a pressure equalization step with at least one adsorber to be pressurized at the lower pressure or for purging at least one other adsorber. Once the final pressure of the cocurrent expansion process has been reached, for example at a pressure of 4 bar, a purge gas is introduced into the outlet end of the adsorber and a gaseous stream enriched in desorbed components is withdrawn from the inlet end. The purge gas is obtained from another adsorber passing through a cocurrent expansion phase. This purging step under intermediate pressure is continued until most of component C has been flushed out of the adsorber. Thereafter, the adsorber is subjected to countercurrent expansion to the lowest process pressure, e.g., 1.5 bar. At this pressure, a further purging step is then preferably conducted with expansion gas taken from another adsorber; and during this step, the regeneration of the adsorber is completed. After termination of the purging step, the adsorber is pressurized in the usual way by single or multistage pressure equalization with adsorbers to be expanded, as well as by a final pressurizing to the adsorption pressure by the introduction of crude gas or product gas.

Since the purge gas obtained by cocurrent expansion of other adsorbers contains a relatively high proportion of component B (which proportion increases with decreasing pressure of the adsorber yielding the expansion gas), it is advantageous during the second purging step to withdraw the purge gas loaded with desorbate from the central zone of the adsorber. (Central zone withdrawal is a technique invented by our coworker Paul Leitgeb and described in a concurrently filed application, Ser. No. 895,654, entitled "Pressure Swing Adsorption".) Otherwise that part of the adsorber substantially freed of component C during the intermediate-pressure purging step, will be loaded with an appreciable amount of component B.

Tables 1 and 2 represent segments of a PSA cycle having an arbitrary number of adsorbers; merely the cycle steps essential to this invention are tabulated. According to Table 1, three adsorbers participate in the cycle steps of the invention. The adsorber 1 which may have previously passed through several cocurrent expansion stages after termination of an adsorption phase, is placed, during a cocurrent expansion stage PP1, in communication with an adsorber 2 subjected to a purging phase P1. After termination of this phase, communication between the adsorbers is interrupted, and adsorber 2 is expanded countercurrently to the adsorption direction (D). The adsorber 1, during this phase, can either pass through a further cocurrent expansion phase or it can also remain in the condition attained at the conclusion of phase PP1. This depends in detail on the choice of the respective adsorption method.

After adsorber 2 has ended its countercurrent expansion phase, it is again connected to adsorber 1 while the latter is subjected to a further cocurrent expansion phase PP2 and yields purge gas for adsorber 2 in a purging phase P2 operated at the lowest process pressure. While adsorber 2, after termination of phase P2, is repressurized in the usual manner, adsorber 1 has reached, after the end of phase PP2, the intermediate pressure at which a first purging step takes place with cocurrent expansion gas from adsorber 3 while the latter is subjected to runs through a cocurrent expansion phase PP1. Subsequently, the adsorber 1 is expanded countercurrently to the lowest process pressure (D) and then purged (P2) with additional purge gas from adsorber 3 which is then being subjected to cocurrent expansion phase PP2.

While, in this example, both purging cycles are effected by a cocurrent expansion gas obtained from the same adsorber, it is, of course, also possible to utilize expansion gases from various adsorbers for this purpose.

In the example shown in Table 2, purging at lowest process pressure has been omitted since adequate desorption is already accomplished by the countercurrent expansion phase D. The cycle scheme according to Table 1 is thereby simplified substantially in that cycle steps P2 and PP2, are eliminated.

TABLE 1

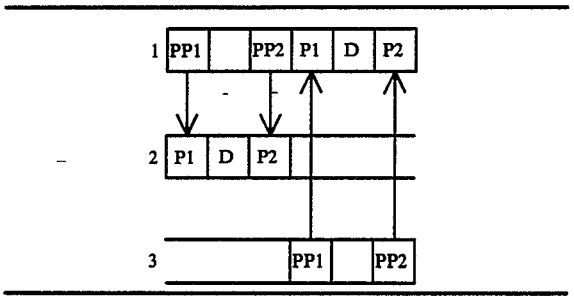

TABLE 2

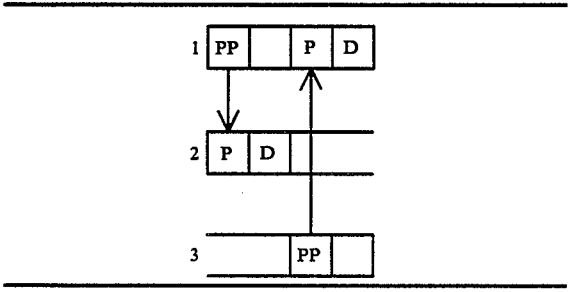

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a pressure swing adsorption process, for the separation of a gaseous mixture comprising: (a) an adsorption phase operated under elevated pressure wherein adsorbable components are selectively adsorbed on an adsorbent resulting in a gaseous stream depleted in the adsorbed components, (b) an expansion phase wherein the adsorber pressure is lowered, (c) a purging phase wherein the adsorbent is regenerated by passing a purging gas thereover under low pressure, and (d) a pressurizing phase wherein the adsorber is again brought to the elevated pressure, so that the cycle can be repeated, the improvement wherein the gaseous mixture contains a most strongly adsorbable component and a less strongly adsorbable component and, during the purging phase (c), an adsorber is purged in a first purge step with a purge gas under an intermediate pressure between the adsorption pressure and the lowest expansion pressure and a gas is withdrawn from the adsorber which is enriched in the most strongly adsorbable component; and further comprising, after completion of said first purge step, conducting an expansion cocurrently for a first section of the adsorber loaded predominantly with the most strongly adsorbable component, and countercurrently for a second section of the adsorber loaded predominantly with the less strongly adsorbable component, lowering the pressure to the lowest expansion pressure, and withdrawing a residual gas from the adsorber.

2. A process according to claim 1, wherein purging at the intermediate pressure is performed countercurrently to the direction of adsorption.

3. A process according to claim 2, further comprising conducting a further purging of the adsorber in a second purge step at the lowest expansion pressure.

4. A process according to claim 2, wherein the adsorber is expanded cocurrently to the intermediate pressure.

5. A process according to claim 2, wherein said first purge step at the intermediate pressure is conducted countercurrently and is terminated before substantial proportions of the less adsorbable components exit from the adsorber.

6. A process according to claim 1, further comprising conducting a further purging of the adsorber in a second purge step at the lowest expansion pressure.

7. A process according to claim 6, wherein said first purge step at the intermediate pressure is conducted countercurrently and is terminated before substantial proportions of the less adsorbable components exit from the adsorber.

8. A process according to claim 1, wherein the adsorber is expanded cocurrently to the intermediate pressure.

9. A process according to claim 1, wherein said first purge step at the intermediate pressure is conducted counter-currently and is terminated before substantial proportions of the less adsorbable components exit from the adsorber.

10. A process according to claim 1, wherein the less adsorbable component is utilized as the purge gas.

11. A process according to claim 1, wherein the intermediate purging pressure ranges about 1–6 bar above the lowest process pressure.

12. In a pressure swing adsorption process, for the separation of a gaseous mixture comprising: (a) an adsorption phase operated under elevated pressure wherein adsorbable components are selectively adsorbed on an adsorbent resulting in a gaseous stream depleted in the adsorbed components, (b) an expansion phase wherein the adsorber pressure is lowered, (c) a purging phase wherein the adsorbent is regenerated by passing a purging gas thereover under low pressure, and (d) a pressurizing phase wherein the adsorber is again brought to the elevated pressure, so that the cycle can be repeated, the improvement wherein: said gaseous mixture contains a most strongly adsorbable component and a less strongly adsorbable component; and during the purging phase (c) an adsorber is purged in a first purge step with a purge gas under an intermediate pressure between the adsorption pressure and the lowest expansion pressure and a gas is withdrawn from the adsorber which is enriched in the most strongly adsorbable component; said adsorber is subdivided into two mutually separated containers so that, after termination of an adsorption phase the first container is loaded predominantly with the most strongly adsorbable component and the second container is loaded predominantly with the less strongly adsorbable component; and, after said first purge step, only the second container is further expanded to the lowest process pressure to withdraw a residual gas from the adsorber.

* * * * *